(12) United States Patent
Ikunishi

(10) Patent No.: US 7,547,148 B2
(45) Date of Patent: Jun. 16, 2009

(54) CONNECTORED OPTICAL FIBER SHEET AND MANUFACTURING METHOD THEREOF

(75) Inventor: Shogo Ikunishi, Amagasaki (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 31 days.

(21) Appl. No.: 11/778,776

(22) Filed: Jul. 17, 2007

(65) Prior Publication Data
US 2008/0019645 A1 Jan. 24, 2008

(30) Foreign Application Priority Data
Jul. 19, 2006 (JP) ............... 2006-196728

(51) Int. Cl.
*G02B 6/36* (2006.01)

(52) U.S. Cl. ............... 385/78; 385/106; 385/129

(58) Field of Classification Search ............... 385/78, 385/129
See application file for complete search history.

(56) References Cited

U.S. PATENT DOCUMENTS

| | | | |
|---|---|---|---|
| 6,425,691 B1* | 7/2002 | Demangone | 385/53 |
| 2003/0012541 A1* | 1/2003 | Shimomichi et al. | 385/134 |
| 2005/0018974 A1* | 1/2005 | Rolston et al. | 385/83 |
| 2005/0129347 A1* | 6/2005 | Saito et al. | 385/14 |
| 2005/0281518 A1* | 12/2005 | Tanaka et al. | 385/114 |
| 2006/0008236 A1* | 1/2006 | Leeman et al. | 385/134 |
| 2007/0003185 A1* | 1/2007 | Saito et al. | 385/14 |
| 2007/0086707 A1* | 4/2007 | Suzuki et al. | 385/58 |

FOREIGN PATENT DOCUMENTS

| | | |
|---|---|---|
| JP | 5 134146 | 5/1993 |
| JP | 7 13033 | 1/1995 |
| JP | 7 248434 | 9/1995 |
| JP | 7 281052 | 10/1995 |
| JP | 10 62653 | 3/1998 |
| JP | 11 52188 | 2/1999 |
| JP | 2003 14945 | 1/2003 |
| JP | 2003 167134 | 6/2003 |

OTHER PUBLICATIONS

English language Abstract of JP 5-134146.
English language Abstract of JP 7-13033.
English language Abstract of JP 7-248434.
English language Abstract of JP 10-62653.
English language Abstract of JP 11-52188.
English language Abstract of JP 7-281052.
English language Abstract of JP 2003-167134.
English language Abstract of JP 2003-14945.

* cited by examiner

*Primary Examiner*—Frank G Font
*Assistant Examiner*—Eric Wong
(74) *Attorney, Agent, or Firm*—Greenblum & Bernstein, P.L.C.

(57) ABSTRACT

In a connectored optical fiber sheet according to the present invention, a connector is fitted around both optical fibers and sheet base.

5 Claims, 6 Drawing Sheets

CONNECTORED OPTICAL FIBER SHEET
AND MANUFACTURING METHOD
THEREOF

BACKGROUND OF THE INVENTION

1. Field of the Invention

The present invention relates to an optical fiber sheet with connector and a manufacturing method thereof.

2. Description of the Prior Art

Conventionally, connection of optical fibers and connection of an optical fiber to a device have been realized by the intermediation of connectors (connector connection). This mode of connection reduces the time required for connection and enables easy detachment.

There are some applications where a plurality of optical fibers are attached to one connector. In this case, a connector having a plurality of V-grooves or holes arranged generally in parallel is used such that the optical fibers are set in the V-grooves or holes as disclosed in Japanese Laid-Open Patent Publications Nos. H5-134146, H7-013033, H7-248434, H10-062653 and H11-052188.

In recent years, some optical communication applications are realized by using an optical fiber sheet. The optical fiber sheet is formed by a sheet base and a plurality of optical fibers fixed to the sheet base as disclosed in Japanese Laid-Open Patent Publications Nos. H7-281052 (Patent Document A) and 2003-167134 (Patent Document B). Attaching a connector to an end of an optical fiber extending outward from the sheet base enables connection with another optical fiber, or the like. Japanese Laid-Open Patent Publication No. 2003-14945 discloses a method for manufacturing such an optical fiber sheet.

When attaching a connector to each of the plurality of optical fibers of the optical fiber sheet as disclosed in Patent Documents A and B, a cover is removed from part of the optical fiber extending outward from the optical fiber sheet before the connector is attached to the uncovered end of the optical fiber. This mode of connector attachment requires time and effort and increases the manufacture cost. Removal of the cover and attachment of the connector are accompanied by the probability of bending the optical fiber. This can decrease the attachment yield of connector.

In the case of connecting optical fibers of an optical fiber sheet disclosed in Patent Documents A and B to other optical fibers, there is a probability of error connection. This decreases the work efficiency in connector connection.

SUMMARY OF THE INVENTION

The present invention enables manufacture of an optical fiber sheet with saved time and effort and high yield and improves the work efficiency in connector connection.

A connectored optical fiber sheet according to the present invention includes an optical fiber sheet which includes a sheet base and a plurality of optical fibers arranged over a surface of the sheet base such that the optical fibers are fixed to the sheet base; and a connector fitted around the optical fiber sheet.

In the above structure, the connector is not attached to each of the optical fibers of the optical fiber sheet but is attached to the optical fiber sheet. Namely, the connector through-hole accommodates the sheet base as well as the optical fibers.

A method for manufacturing a connectored optical fiber sheet according to the present invention includes the steps of: (a) preparing an optical fiber sheet which includes a sheet base and a plurality of optical fibers arranged over a surface of the sheet base such that the optical fibers are fixed to the sheet base; and (b) fitting a connector around the optical fiber sheet.

DESCRIPTION OF THE PREFERRED EMBODIMENTS

Hereinafter, embodiments of the present invention will be described in detail with reference to the drawings. It should be noted that the present invention is not limited to the embodiments described below.

Embodiment 1

Figure 1:
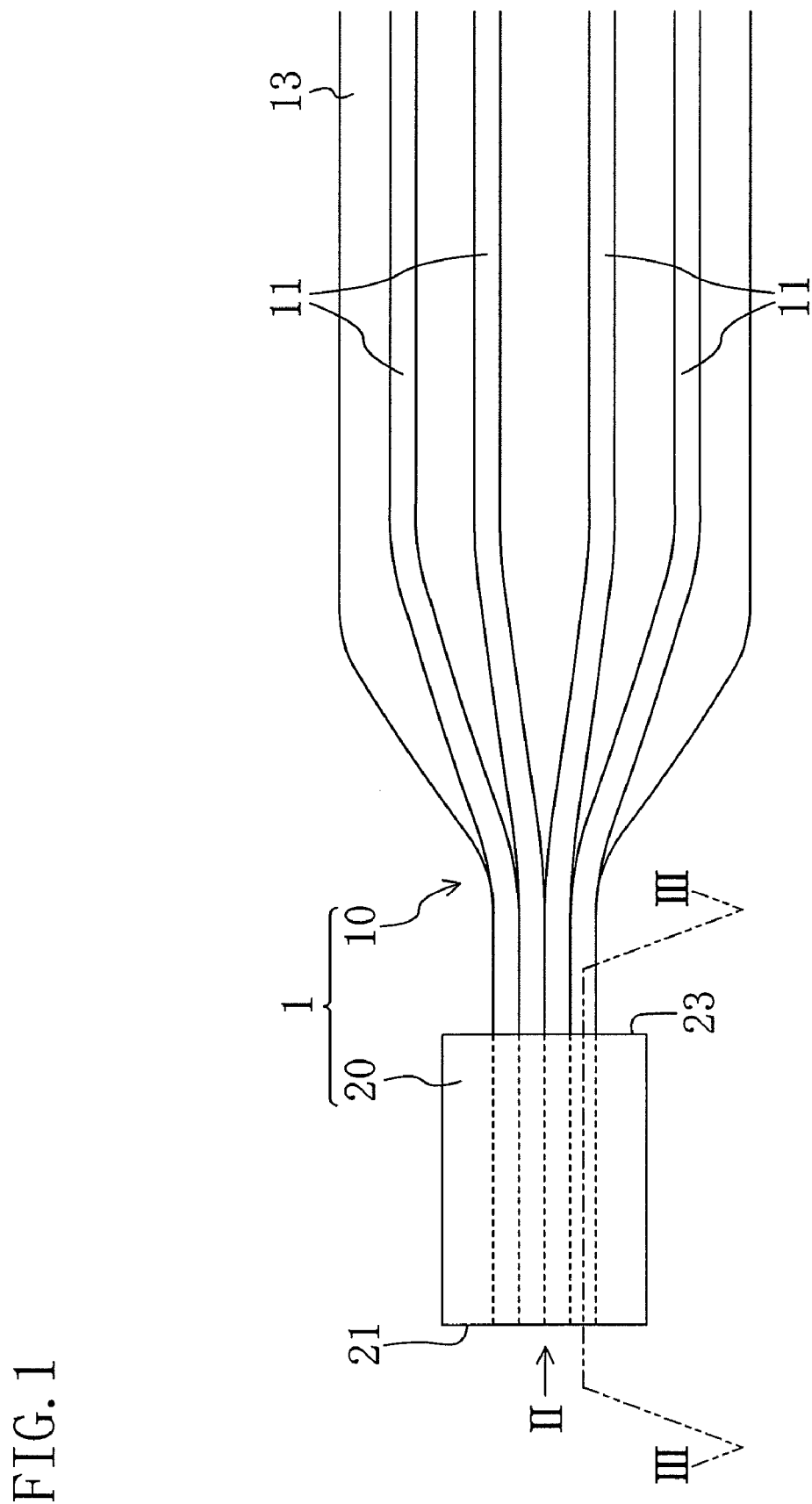
FIG. 1 is a plan view of a connectored optical fiber sheet according to Embodiment 1 of the present invention.
Figure 2:
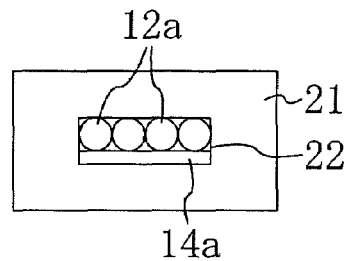
FIG. 2 shows a face of the connectored optical fiber sheet seen in direction II of FIG. 1.
Figure 3:
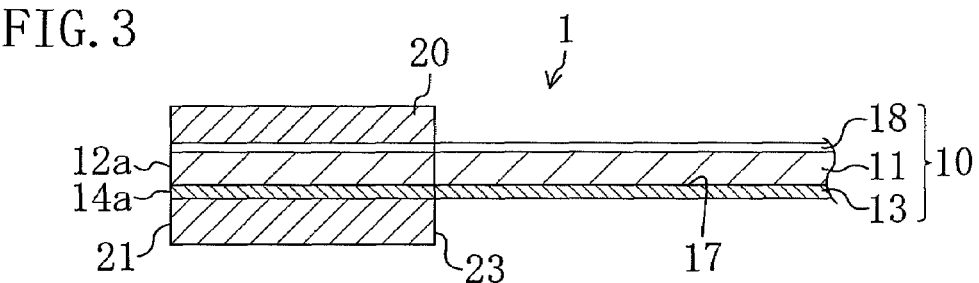
FIG. 3 is a cross-sectional view of the connectored optical fiber sheet taken along line III-III of FIG. 1.

FIG. 1 is a plan view of an optical fiber sheet having a connector ("connectored optical fiber sheet 1") according to Embodiment 1. FIG. 2 shows a front face of the connector of the connectored optical fiber sheet 1 seen in direction II of FIG. 1. FIG. 3 is a cross-sectional view of the connectored optical fiber sheet 1 taken along line III-III of FIG. 1. Although FIG. 1 and FIG. 2 show, for clarity of illustration, four optical fibers 11 fixed to a sheet base 13, the number of optical fibers 11 is not limited to a specific number.

Figure 4A:
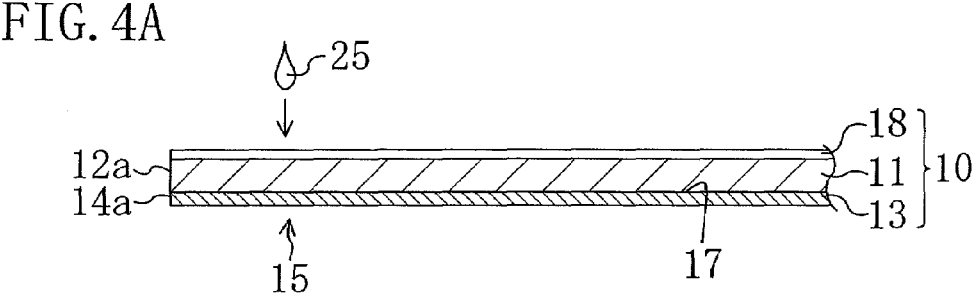
FIG. 4A is a longitudinal cross-sectional view for illustrating a step of a method for manufacturing the connectored optical fiber sheet according to Embodiment 1 of the present invention.

In the connectored optical fiber sheet 1 according to this embodiment, the connector 20 is fitted around an optical fiber sheet 10 via glue 25 (shown in FIG. 4A). Herein, the condition of being "fitted around" is achieved not only by assembling the connector 20 such that the optical fiber sheet 10 fits in a connector through-hole 22 of the connector 20 but also by any other operation than such assemblage (e.g., by inserting the optical fiber sheet 10 into the connector through-hole 22 of the connector 20). In the optical fiber sheet 10, the optical fibers 11 are fixed to the sheet base 13 via an adhesive 17 (shown in FIG. 3) to prevent detachment of the optical fibers 11 from the sheet base 13 at the time of removal of a cover 18 (shown in FIG. 3). Hereinafter, the components of the connectored optical fiber sheet 1 are described before a method for manufacturing the connectored optical fiber sheet 1 is described.

The sheet base 13 of the optical fiber sheet 10 is preferably a base member made of a material of excellent flexibility, such as polyethylene terephthalate (hereinafter, "PET"), polyimide (hereinafter, "PI"), polyethylene (hereinafter, "PE"), silicone resins, etc., but may be a base member made of a relatively hard material, such as metals, Bakelite™ (phenol resin which exhibits thermosetting property), glass epoxy (glass fibers (in a cloth form) impregnated with epoxy resin), etc. Namely, the material of the base member is not limited to any particular materials. The thickness of the sheet base 13 is preferably from 10 μm to 1 mm.

The optical fibers 11 are made of silica glass and are preferably multimode optical fibers each consisting of, for example, a core and a clad. The clad is preferably covered with a cover. In this case, the diameter of the core is preferably from 50 μm to 1000 μm, and the diameter of the clad is preferably 1.25 times the core diameter. The material of the cover is not limited to any particular material but is preferably a UV-curable resin, a silicone resin, nylon (trademark), PI, an alloy (e.g., an alloy of aluminum and gold), or the like. It should be noted that, in FIG. 3, the structure of the optical fiber is not shown in detail for clarity of illustration.

The adhesive 17 is applied over a surface of the sheet base 13. The adhesive 17 is not limited to any particular adhesive but may be any of silicone adhesives, acrylic adhesives, rubber adhesives, epoxy adhesives, etc. Preferably, the adhesive 17 is an adhesive which has excellent heat tolerance and flexibility (e.g., a silicone adhesive).

The cover 18 is a film which covers the optical fibers 11 and may be made of a material of excellent flexibility, such as PET, PI, PE, silicone resins, etc. Alternatively, the cover 18 may be made of a relatively hard material, such as metals, Bakelite™, glass epoxy, etc.

A preferable structure example of the optical fiber sheet 10 is such that the fiber diameter of each optical fiber 11 is 0.25 mm, the number of the optical fibers 11 is 16, and the thickness of the sheet base 13 is 0.25 mm.

The connector 20 is preferably made of plastic (e.g., epoxy resin), ceramic (e.g., zirconia), glass, metal, etc. The connector 20 is preferably an assembly-type connector in view of cost reduction but may be an insertion-type connector. A commercially-available connector can be used for the connector 20. Herein, the assembly-type connector consists of upper and lower pieces and is fitted around the optical fiber sheet by first setting the optical fiber sheet in the lower piece before fittedly combining the upper piece with the lower piece. The insertion-type connector is fitted around the optical fiber sheet by inserting the optical fiber sheet into a connector through-hole.

The connector 20 has a connector connection end face 21, the connector through-hole 22, and a connector rear end face 23. The connector connection end face 21 is a connection interface at which the connector 20 is connected to another connector, or the like. The external shape of the connector connection end face 21 is not limited to the example shown in FIG. 1 but may be a shape which enables the end face 21 to fit in with an element to be connected. The connector rear end face 23 is opposite to the connector connection end face 21. The connector through-hole 22 is a hole extending between the connector connection end face 21 and the connector rear end face 23, in which the optical fiber sheet 10 is to be fitted. The connector through-hole 22 is preferably designed in accordance with the size of the optical fiber sheet 10 to be inserted therein. The size of the connector through-hole 22 of this embodiment may be such that the width is generally equal to (fiber diameter)×(number of optical fibers), and the height is generally equal to (fiber diameter)+(thickness of sheet base).

Part of the optical fiber sheet 10 which is to be fitted into the connector 20 may have a structure such that the optical fibers 11 are directly fixed over the sheet base 13. Namely, this part may not have the cover 18. Whether or not part of the optical fiber sheet 10 which is to be fitted in the connector 20 is covered with the cover 18 is merely a matter of design choice as to the height of the connector through-hole 22 and thus can be determined arbitrarily. To improve the position accuracy of the optical fibers 11 in the connector through-hole 22, preferably, the cover 18 is not provided in the vicinity of the connector connection end face 21.

In the connectored optical fiber sheet 1 according to this embodiment, the above-described connector 20 is fitted around the optical fiber sheet 10. Specifically, the optical fibers 11 and the sheet base 13 of the optical fiber sheet 10 pass through the connector through-hole 22 from the connector connection end face 21 to the connector rear end face 23 and extend outward beyond the connector rear end face 23. Thus, both the optical fibers 11 and the sheet base 13 are seen in the connector connection end face 21. The front end faces 12a of the optical fibers 11 and the front end face 14a of the sheet base 13 are on the same plane.

Examples of the glue 25 used for adhering the connector 20 to the optical fiber sheet 10 include thermosetting resins, such as epoxy resin glues, acrylate glues, etc., UV-curable resins, and resins curable by chemical reactions. The glue 25 is, however, not limited to any particular glue but may be a known glue. A thermosetting resin is preferable in view of easy adhesion.

Figure 4B:
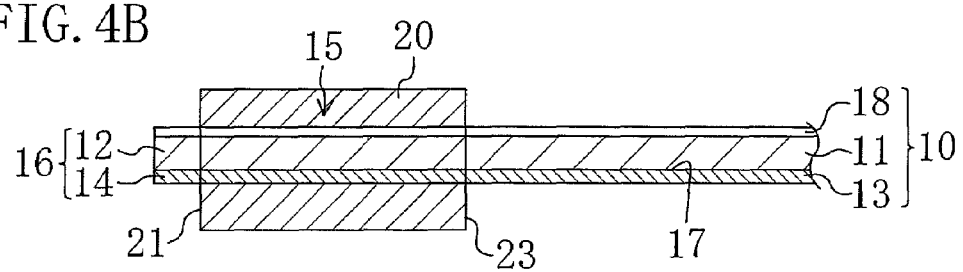
FIG. 4B is a longitudinal cross-sectional view for illustrating another step of the method for manufacturing the connectored optical fiber sheet according to Embodiment 1 of the present invention.

FIG. 4A is a longitudinal cross-sectional view for illustrating a step of a method for manufacturing the connectored optical fiber sheet 1 according to this embodiment. FIG. 4B is a longitudinal cross-sectional view for illustrating another step of the method for manufacturing the connectored optical fiber sheet 1 according to this embodiment.

First, the optical fiber sheet 10 shown in FIG. 4A is prepared (Step (a)). At a fit-in end 15 of the optical fiber sheet 10, around which the connector 20 is fitted, a front end face 12a of each optical fiber 11 and a front end face 14a of the sheet base 13 are on substantially the same plane. A method for manufacturing the optical fiber sheet 10 having such a structure is such that, for example, the adhesive 17 is first applied over the sheet base 13, and then, the optical fibers 11 are set on the adhesive 17, before the cover 18 is set over the optical fibers 11 in a vacuum. Thereafter, the glue 25 is applied on the fit-in end 15 of the optical fiber sheet 10.

Then, in the case where the connector 20 prepared herein is an insertion-type connector, the fit-in end 15 of the optical fiber sheet 10 is inserted from the connector rear end face 23 into the connector through-hole 22 such that a front end 16 of the sheet 10 (i.e., front ends of the optical fibers 11 and sheet base 13) extends out of the connector 20 at the connector connection end face 21 as shown in FIG. 4B (Step (b)). As a result, the connector 20 is fitted around the fit-in end 15 of the optical fiber sheet 10.

In the case where the connector 20 prepared herein is an assembly-type connector, although not shown, the optical fiber sheet 10 is set in the lower piece of the connector such that the front end 16 of the fit-in end 15 of the optical fiber sheet 10 extends out of the connector 20 at the connector connection end face 21, and thereafter, the upper piece of the connector is fittedly combined with the lower piece.

Then, the glue 25 is cured. Thereafter, although not shown, the front end 16 of the fit-in end 15 of the optical fiber sheet 10 is cut away (Step (c)), and the cut surface is polished in almost all the cases. As a result, the front end faces 12a of the optical fibers 11 and the front end face 14a of the sheet base 13 of the optical fiber sheet 10 are on substantially the same plane as the connector connection end face 21. In this way, the connectored optical fiber sheet 1 shown in FIG. 1 is manufactured.

Hereinafter, the differences between the conventional connectored optical fiber sheet and the connectored optical fiber sheet 1 according to this embodiment are described.

The conventional connectored optical fiber sheet includes a plurality of optical fibers fixed over the sheet base as in the connectored optical fiber sheet 1 of this embodiment. Each of the optical fibers extends out of the sheet base, and a connector is attached to the end of each optical fiber. Therefore, the number of connectors necessary is equal to the number of optical fibers, so that it is difficult to provide the connectored optical fiber sheet at a low cost. The number of connectors attached, which equals the number of optical fibers, impedes the size reduction of the connectored optical fiber sheet. At the end of each optical fiber, a cover is removed for attaching a connector, and this causes difficulty in completing manufacture within a short time. Further, removing the cover and attaching a connector to the uncovered optical fiber are accompanied by the probability of bending the optical fiber.

In the connector connection of the optical fibers of the conventional connectored optical fiber sheet with other optical fibers, or the like, the work of connector connection is required for each optical fiber, resulting in a low work efficiency of connector connection. At the time of connector connection, there is a probability that an optical fiber of the conventional connectored optical fiber sheet is erroneously connected to an unintended optical fiber, which can result in a lower work efficiency of connector connection.

In the connectored optical fiber sheet 1 of this embodiment, on the other hand, a plurality of optical fibers 11 and the sheet base 13 are located in the connector through-hole 22 of the connector 20. Therefore, the connectored optical fiber sheet 1 can be manufactured by setting the optical fiber sheet 10 in the connector through-hole 22 without the necessity of attaching a connector to each optical fiber. Thus, the connectored optical fiber sheet 1 can be manufactured within a short time, and the size of the connectored optical fiber sheet 1 can be reduced. Further, the connector 20 can be attached to the optical fiber sheet 10 without removing the cover of each optical fiber 11. Therefore, the connectored optical fiber sheet 1 can be manufactured without the probability of bending the optical fibers 11. Thus, the connectored optical fiber sheet 1 can be manufactured with no risk and high yield.

It is not necessary to prepare a number of connectors which equals the number of optical fibers 11 but only one piece of connector 20. Therefore, the connectored optical fiber sheet 1 can be manufactured at a low cost.

In the connector connection of the optical fibers of the connectored optical fiber sheet of this embodiment with other optical fibers, or the like, connector connection is not necessary for each optical fiber, and therefore, the work efficiency in connector connection can be improved. Since the optical fiber sheet 10 is set in the connector through-hole 22, error connection is prevented, and the work efficiency in connector connection can be further improved.

It should be noted that this embodiment includes structures described below.

In the above-described method for manufacturing the connectored optical fiber sheet, the front ends of the optical fibers may extend ahead of the front end of the sheet base at the step illustrated in FIG. 4A. Conversely, the front end of the sheet base may extend ahead of the front ends of the optical fibers. In any of these cases, it is only necessary to attach the connector to the optical fiber sheet such that the front end faces of the optical fibers and the front end face of the sheet base of the optical fiber sheet extend out of the connector at the connector connection end face in the step illustrated in FIG. 4B.

Embodiment 2

In a connectored optical fiber sheet according to Embodiment 2, although not shown, optical fibers fixed over a sheet base are not made of silica glass but plastic. For example, each of the plastic optical fibers has a core diameter of 240 μm and a fiber diameter of 250 μm.

The connectored optical fiber sheet of this embodiment can be manufactured in accordance with the manufacturing method described in Embodiment 1 except that polishing of a cut surface can be omitted.

Even when the optical fibers 11 are plastic optical fibers, substantially the same effects as those of Embodiment 1 are achieved.

Using the plastic optical fibers eliminate the necessity of the above-described polishing process. Alternatively, a hot plate method may be used for shaping end faces of the optical fibers. Shaping the end faces of the optical fibers using the hot plate method enables instantaneous shaping of the end faces of the optical fibers. Thus, the manufacture time can be further reduced, and the connectored optical fiber sheet can be provided at a low cost, as compared with the applications of the silica glass optical fibers.

Embodiment 3

Figure 5:
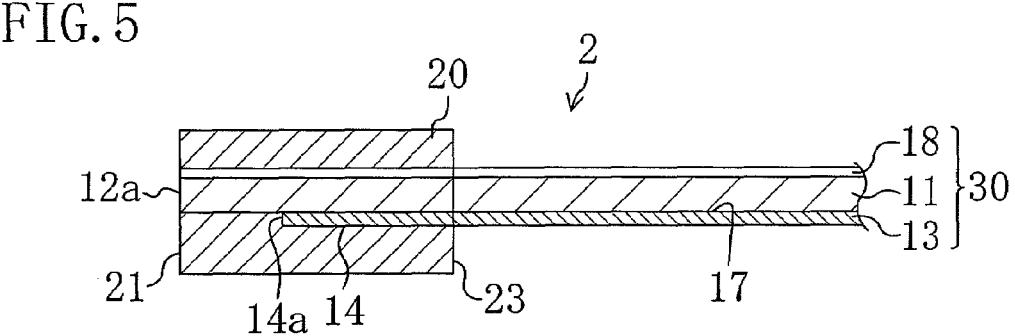
FIG. 5 shows a longitudinal cross-section of a connectored optical fiber sheet according to Embodiment 3 of the present invention.

FIG. 5 shows a longitudinal cross-section of a connectored optical fiber sheet 2 according to Embodiment 3.

In the connectored optical fiber sheet 2 according to this embodiment, the optical fibers 11 of an optical fiber sheet 30 pass through the connector through-hole 22 from the connector connection end face 21 to the connector rear end face 23 and extend outward beyond the connector rear end face 23. The sheet base 13 extends not from the connector connection end face 21 but from the inside of the connector through-hole 22 toward the connector rear end face 23 and extends outward beyond the connector rear end face 23. Thus, the front end faces 12a of the optical fibers 11 are on generally the same plane as the connector connection end face 21, while the front end 14 of the sheet base 13 is located in the connector through-hole 22.

Also in this case, the preferable size of the connector through-hole 22 of the connector 20 is such that, as described in Embodiment 1, the width is equal to (fiber diameter)× (number of optical fibers), and the height is equal to (fiber diameter)+(thickness of sheet base).

It should be noted that, as described in Embodiment 1, part of the optical fiber sheet 30 which is to be fit in the connector 20 may have a structure such that the optical fibers 11 are directly fixed over the sheet base 13. Namely, this part of the optical fiber sheet 30 may not have the cover 18.

Figure 6A:
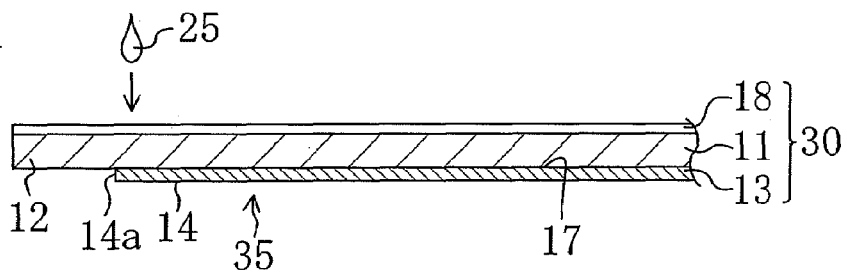
FIG. 6A is a longitudinal cross-sectional view for illustrating a step of a method for manufacturing the connectored optical fiber sheet according to Embodiment 3 of the present invention.
Figure 6B:
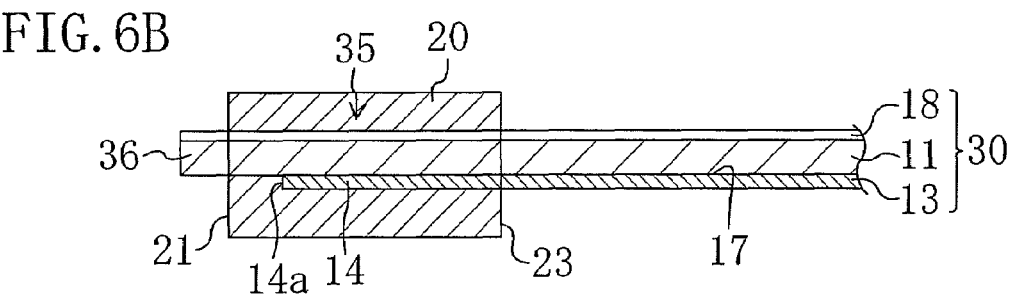
FIG. 6B is a longitudinal cross-sectional view for illustrating another step of the method for manufacturing the connectored optical fiber sheet according to Embodiment 3 of the present invention.

FIG. 6A is a longitudinal cross-sectional view for illustrating a step of a method for manufacturing the connectored optical fiber sheet 2 according to this embodiment. FIG. 6B is a longitudinal cross-sectional view for illustrating another step of the method for manufacturing the connectored optical fiber sheet 2 according to this embodiment.

First, the optical fiber sheet 30 shown in FIG. 6A is prepared (Step (a)). At a fit-in end 35 of the optical fiber sheet 30, a front end 12 of each optical fiber 11 extends ahead of a front end face 14a of the sheet base 13. The optical fiber sheet 30 having such a structure can be manufactured in accordance with the manufacturing method described in Embodiment 1. Thereafter, the glue 25 is applied on the fit-in end 35 of the optical fiber sheet 30.

Then, in the case where the connector 20 prepared herein is an insertion-type connector, the fit-in end 35 of the optical fiber sheet 30 is inserted from the connector rear end face 23 into the connector through-hole 22 (Step (b)). At this step, the front end 36 of the fit-in end 35 of the optical fiber sheet 30 (i.e., the front ends of the optical fibers 11) extends out of the connector 20 at the connector connection end face 21 while the front end 14 of the sheet base 13 is located in the connector through-hole 22 as shown in FIG. 6B. As a result, the connector 20 is fitted around the fit-in end 35 of the optical fiber sheet 30.

In the case where the connector 20 prepared herein is an assembly-type connector, although not shown, the optical fiber sheet 30 is set in the lower piece of the connector such that the front ends 12 of the optical fibers 11 of the optical fiber sheet 30 extend out of the connector 20 at the connector connection end face 21 and that the front end 14 of the sheet base 13 is located in the connector through-hole 22. Thereafter, the upper piece of the connector is fittedly combined with the lower piece.

Then, the glue 25 is cured. Thereafter, although not shown, the front end 36 of the fit-in end 35 is cut away (Step (c)), and the cut surface is polished in almost all the cases. As a result, the front end faces 12a of the optical fibers 11 are on substantially the same plane as the connector connection end face 21. In this way, the connectored optical fiber sheet 2 shown in FIG. 5 is manufactured.

As described above, in the connectored optical fiber sheet 2 of this embodiment, the sheet base 13 is located in the connector through-hole 22, and therefore, the connectored optical fiber sheet 2 of this embodiment achieves substantially the same effects as those of Embodiment 1.

It should be noted that this embodiment include structures described below.

The optical fibers 11 may be silica glass optical fibers or may be plastic optical fibers.

Embodiment 4

Figure 7A:
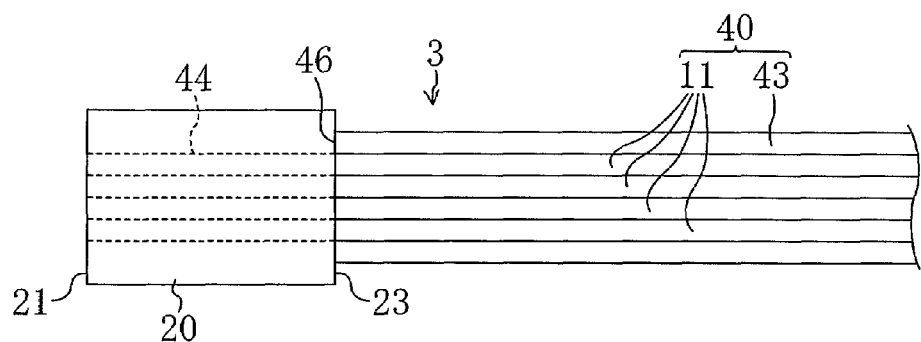
FIG. 7A is a plan view of a connectored optical fiber sheet according to Embodiment 4 of the present invention.
Figure 7B:
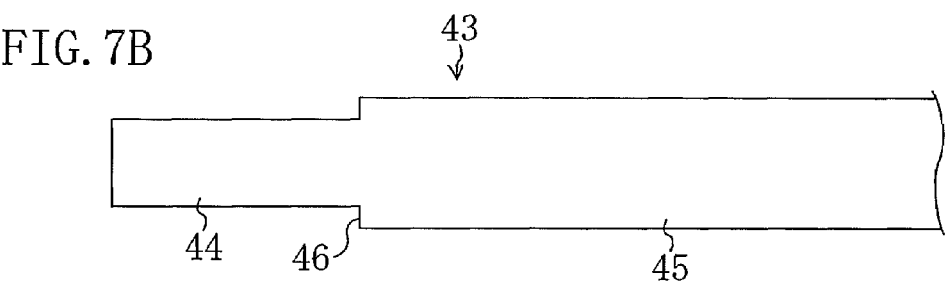
FIG. 7B is a plan view of a sheet base according to Embodiment 4 of the present invention.

FIG. 7A is a plan view of a connectored optical fiber sheet 3 according to Embodiment 4. FIG. 7B is a plan view of a sheet base 43 according to this embodiment.

In the connectored optical fiber sheet 3 according to this embodiment, the optical fibers 11 and the sheet base 43 pass through the connector through-hole 22 from the connector connection end face 21 to the connector rear end face 23 and extend outward beyond the connector rear end face 23 as in Embodiment 1. The sheet base 43 has a shoulder 46, which makes Embodiment 4 different from Embodiment 1.

The shoulder 46 is a part of the sheet base 43 which is to abut on the connector rear end face 23 and at which the width of the sheet base 43 changes. Specifically, the width of the frontal part 44 of the sheet base 43 ahead of the shoulder 46 is equal to or smaller than the width of the connector through-hole 22, but the width of the rear part 45 of the sheet base 43 behind the shoulder 46 is greater than the width of the connector through-hole 22. The shoulder 46 serves as a positioning feature in fitting the connector 20 around an optical fiber sheet 40 as will be described later.

Next, a method for manufacturing the connectored optical fiber sheet 3 of this embodiment is described.

First, the optical fibers 11 are adhered over the surface of the sheet base 43 shown in FIG. 7B to prepare an optical fiber sheet 40 (Step (a)).

Then, in the case where the connector 20 prepared herein is an insertion-type connector, the frontal part 44 of the sheet base 43 ahead of the shoulder 46 is inserted into the connector through-hole 22. Since the width of the frontal part 44 is equal to or smaller than the width of the connector through-hole 22, the frontal part 44 can be inserted in the connector through-hole 22. However, the shoulder 46 cannot be inserted in the connector through-hole 22 because the width of the shoulder 46 is greater than the width of the connector through-hole 22. When the shoulder 46 abuts on the connector rear end face 23, insertion of the optical fiber sheet 40 into the connector 20 is stopped (Step (b)).

In the case where the connector 20 prepared herein is an assembly-type connector, the connector 20 is fitted around the optical fiber sheet 40 such that the shoulder 46 abuts on the connector rear end face 23 of the connector 20.

Thereafter, the front end of the optical fiber sheet 40 is cut away, whereby the manufacture of the connectored optical fiber sheet 3 is completed.

As described above, the optical fiber sheet 40 of this embodiment has the shoulder 46 which serves as a positioning feature, and therefore, the connector 20 can be fitted around the optical fiber sheet 40 such that the connector 20 is appropriately positioned relative to the optical fiber sheet 40.

It should be noted that this embodiment include structures described below.

The width of the sheet base only needs to be greater than the width of the connector through-hole at the position of the shoulder. For example, the rear part of the sheet base behind the shoulder may have a width equal to or smaller than the width of the connector through-hole, or may have a width linearly increasing from the shoulder toward the rear end of the sheet base, so long as the shoulder of the sheet base has a greater width than the connector through-hole.

In the connectored optical fiber sheet of this embodiment, the front end of the sheet base may be located in the connector through-hole while the optical fibers pass through the connector through-hole from the connector connection end face to the connector rear end face and extend outward beyond the connector rear end face as in Embodiment 3.

Embodiment 5

In this section, variations of the connectored optical fiber sheet of Embodiment 1 are described.

(First Variation)

Figure 8:
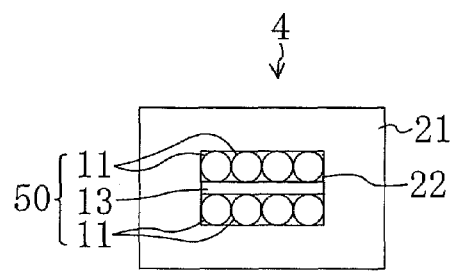
FIG. 8 shows a connector connection end face of a connectored optical fiber sheet of the first variation of Embodiment 5 of the present invention.

FIG. 8 shows the connector connection end face 21 of a connectored optical fiber sheet 4 of the first variation.

In the connectored optical fiber sheet 4 of the first variation, the optical fibers 11 and the sheet base 13 of an optical fiber sheet 50 pass through the connector through-hole 22 from the connector connection end face 21 to the connector rear end face and extend outward beyond the connector rear end face as in Embodiment 1. In this optical fiber sheet 50, a plurality of optical fibers 11 are fixed not only over the upper surface but also over the lower surface of the sheet base 13.

In this case, the width of the connector through-hole 22 may be generally equal to (fiber diameter)×(number of optical fibers), and the height of the connector through-hole 22 may be generally equal to (fiber diameter)×2+(thickness of sheet base).

As described in Embodiment 1, part of the optical fiber sheet 50 which is to be fit into the connector 20 may have a structure such that the optical fibers 11 are directly fixed over the sheet base 13. Namely, this part of the optical fiber sheet 50 may not have the cover 18.

(Second Variation)

Figure 9:
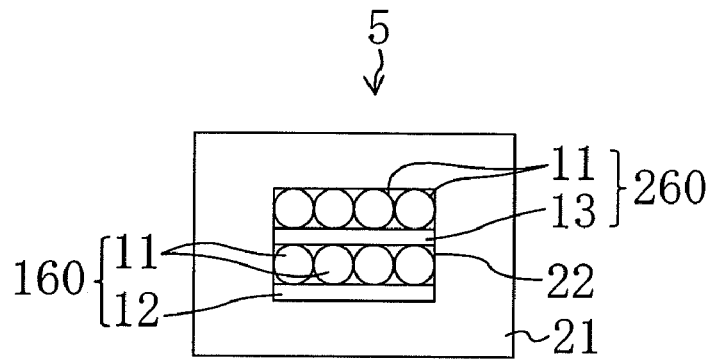
FIG. 9 shows a connector connection end face of a connectored optical fiber sheet of the second variation of Embodiment 5 of the present invention.

FIG. 9 shows the connector connection end face 21 of a connectored optical fiber sheet 5 of the second variation.

In the connectored optical fiber sheet 5 of the second variation, first and second optical fiber sheets 160 and 260 arranged in two layers are set in one connector through-hole 22. Specifically, the first optical fiber sheet 160 is set in the connector through-hole 22 with the sheet base 13 underlying the optical fibers 11, and the second optical fiber sheet 260 is set over the first optical fiber sheet 160 in the connector through-hole 22 with the sheet base 13 underlying the optical fibers 11.

Figure 10:
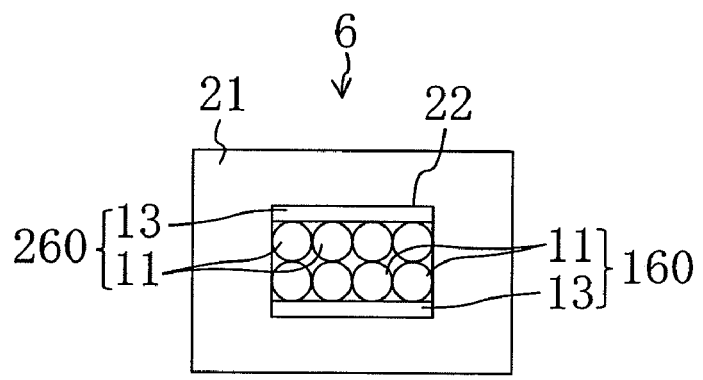
FIG. 10 shows a connector connection end face of another connectored optical fiber sheet of the second variation of Embodiment 5 of the present invention.

Alternatively, a connectored optical fiber sheet 6 shown in FIG. 10 is also possible wherein the first optical fiber sheet 160 is set in the connector through-hole 22 with the sheet base 13 underlying the optical fibers 11, and the second optical fiber sheet 260 is set over the first optical fiber sheet 160 in the connector through-hole 22 with the sheet base 13 overlying the optical fibers 11.

Still alternatively, although not shown, the first and second optical fiber sheets may be arranged such that the first optical fiber sheet is set in the connector through-hole with the sheet base overlying the optical fibers, and the second optical fiber sheet is set over the first optical fiber sheet in the connector through-hole with the sheet base underlying the optical fibers.

In any of the above examples, the optical fibers 11 and the sheet bases 13 of the first and second optical fiber sheets 160 and 260 pass through the connector through-hole 22 from the connector connection end face 21 to the connector rear end face and extend outward beyond the connector rear end face. The width of the connector through-hole 22 may be generally equal to (fiber diameter)×(number of optical fibers), and the height of the connector through-hole 22 may be generally equal to (fiber diameter)×2+(thickness of sheet base)×2.

As described in Embodiment 1, parts of the optical fiber sheets 160 and 260 which are to be fit into the connector 20 may have a structure such that the optical fibers 11 are directly fixed over the sheet base 13. Namely, these parts of the optical fiber sheets 160 and 260 may not have the cover 18.

In the second variation, the number of optical fiber sheets set in the connector through-hole is not limited to any particular number. Three or more optical fiber sheets may be set in one connector through-hole. The size of the connector through-hole may be appropriately determined according to the number of optical fiber sheets.

(Third Variation)

Figure 11:
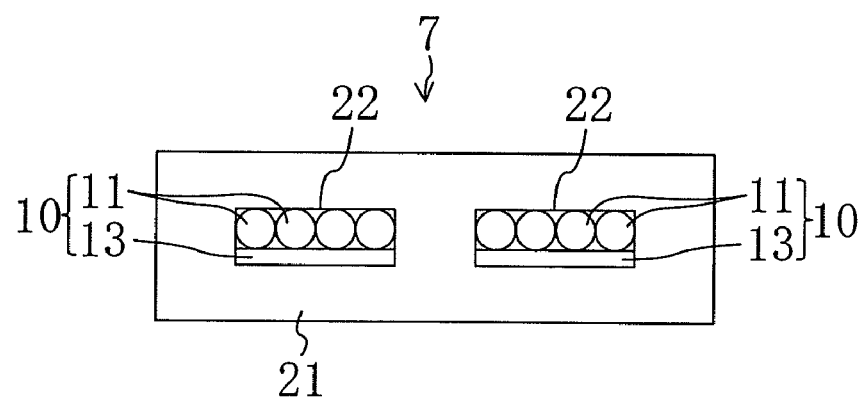
FIG. 11 shows a connector connection end face of a connectored optical fiber sheet of the third variation of Embodiment 5 of the present invention.

FIG. 11 shows the connector connection end face 21 of a connectored optical fiber sheet 7 of the third variation.

The connector of the third variation has two connector through-holes arranged in a side by side layout. Each of the connector through-holes 22 accommodates one optical fiber sheet 10.

Figure 12:
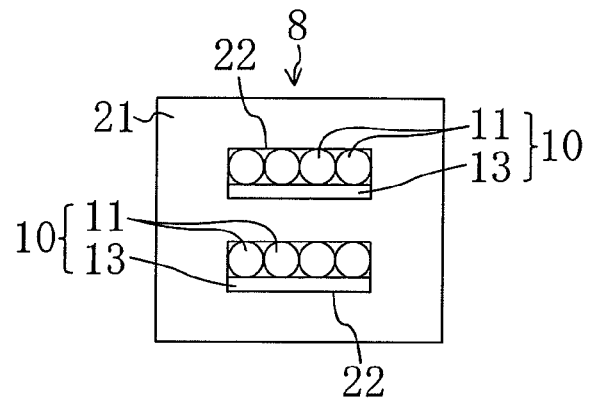
FIG. 12 shows a connector connection end face of another connectored optical fiber sheet of the third variation of Embodiment 5 of the present invention.

Alternatively, a connectored optical fiber sheet 8 shown in FIG. 12 is also possible wherein the connector has two connector through-holes 22 arranged in a double-deck layout.

In any of the above examples, the optical fibers 11 and the sheet bases 13 of the optical fiber sheets 10 pass through the connector through-holes 22 from the connector connection end face 21 to the connector rear end face and extend outward beyond the connector rear end face.

In the third variation, the number and arrangement of connector through-holes are not limited to the above-described examples. For example, one connector may have three or more connector through-holes.

(Fourth Variation)

Figure 13A:
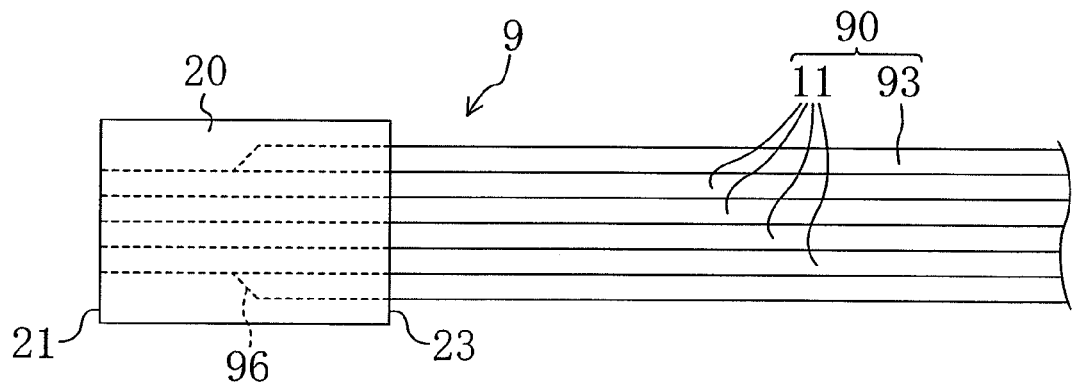
FIG. 13A is a plan view of a connectored optical fiber sheet of the fourth variation of Embodiment 5 of the present invention.
Figure 13B:
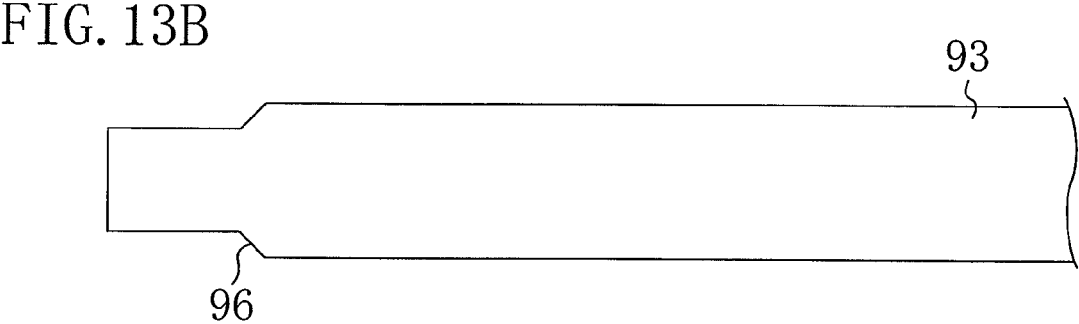
FIG. 13B is a plan view of a sheet base of the fourth variation of Embodiment 5 of the present invention.

FIG. 13A is a plan view of a connectored optical fiber sheet 9 of the fourth variation. FIG. 13B is a plan view of a sheet base 93 of the fourth variation.

In the connectored optical fiber sheet 9 of the fourth variation, the optical fibers 11 and the sheet base 93 pass through the connector through-hole 22 from the connector connection end face 21 to the connector rear end face and extend outward beyond the connector rear end face. The sheet base 93 has a shoulder 96 which is to abut on the inner wall of the connector through-hole 22. At the shoulder 96, the width of the sheet base 93 changes in the connector through-hole 22. Specifically, the width of the sheet base 93 changes at the shoulder 96 such that the rear part of the sheet base 93 is wider than the frontal part of the sheet base 93. In this case, the connector through-hole 22 is preferably designed according to the shape of the fit-in end of the sheet base 93.

The shoulder 96 of the sheet base 93 has substantially the same function as that of the shoulder 46 of Embodiment 4.

The connectored optical fiber sheet 9 of the fourth variation can be manufactured in accordance with the method described in Embodiment 4. Specifically, the connectored optical fiber sheet 9 shown in FIG. 13A is first prepared (Step (a)).

Then, in the case where the connector 20 prepared herein is an insertion-type connector, the frontal part of the optical fiber sheet 90 ahead of the shoulder 96 is inserted into the connector through-hole 22. Since the opening in the connector rear end face 23 of the connector 20 is larger than the front end face of the optical fiber sheet 90, the front end of the sheet 90 is inserted through the connector through-hole 22. When the shoulder 96 abuts on corresponding part of the inner wall of the connector through-hole 22, insertion of the optical fiber sheet 90 into the connector 20 is stopped (Step (b)).

In the case where the connector 20 prepared herein is an assembly-type connector, the connector 20 is fitted around the optical fiber sheet 90 such that the shoulder 96 abuts on the corresponding part of the inner wall of the connector through-hole 22.

Thereafter, the front end of the optical fiber sheet 90 is cut away, whereby the manufacture of the connectored optical fiber sheet 9 is completed.

In the fourth variation, the width of the sheet base may, for example, linearly increase from the frontal part to rear part of the sheet base. In the case of the assembly-type connector, the width of the sheet base may linearly decrease from the frontal part to rear part of the sheet base. The connector may have a connector through-hole which has an appropriate shape determined according to the shape of the sheet base.

As described above, in any of the first to fourth variations of this embodiment, the sheet base 13 or sheet base 93 is set in the connector through-hole 22. Thus, substantially the same effects as those of Embodiment 1 are achieved.

In the first to fourth variations of this embodiment, the front end of the sheet base may be located in the connector through-hole while the optical fibers pass through the connector through-hole from the connector connection end face to the connector rear end face and extend outward beyond the connector rear end face. Further, the sheet base may have a shoulder as in Embodiment 4.

The first to fourth variations of this embodiment are preferably manufactured using any of the methods described in Embodiments 1, 3 and 4.

Other Embodiments

The present invention includes other variations of Embodiment 1 which are described below.

The optical fiber sheet may not have a cover so long as the optical fibers are tightly fixed to the sheet base via an adhesive. In the optical fiber sheet, the optical fibers may be accommodated in V-grooves formed in the surface of the sheet base.

The length of part of the optical fiber which is fixed over the sheet base is not limited to any particular length. Specifically, the optical fiber may extend from the frontal end to rear end of the sheet base or may be wound into a roll which is fixed onto the surface of the sheet base. The optical fibers used herein are not limited to the above-described examples or any particular type of optical fibers but may be known optical fibers.

The materials and shapes of the sheet base, cover, and connector are not limited to the above-described examples. The materials of the adhesive and glue are not limited to the above-described examples.

What is claimed is:

1. A connectored optical fiber sheet, comprising:
   an optical fiber sheet which includes a sheet base and a plurality of optical fibers arranged over a surface of the sheet base such that the optical fibers are fixed to the sheet base; and
   a connector fitted around the optical fiber sheet,
   wherein the connector has a connector connection end face which is a connection interface and a connector rear end face which is opposite to the connector connection end face; and
   the optical fiber sheet has a positioning feature which abuts on the connector rear end face, and
   wherein the width of frontal part of the sheet base ahead of the positioning feature is equal to or smaller than the width of the connector through-hole, while the width of the sheet base at the positioning feature is greater than the width of the connector through-hole.

2. The connectored optical fiber sheet of claim 1, wherein:
   the connector further has a connector through-hole; and
   the optical fibers and the sheet base pass through the connector through-hole from the connector connection end face to the connector rear end face and extend outward beyond the connector rear end face.

3. The connectored optical fiber sheet of claim 1,
   wherein in the connector connection end face of the connector, the front end faces of the optical fibers and the front end face of the sheet base are on the same plane as the connector connection end face.

4. The connectored optical fiber sheet of claim 1, wherein:
   the connector further has a connector through-hole;
   the optical fibers pass through the connector through-hole from the connector connection end face to the connector rear end face and extend outward beyond the connector rear end face; and
   a front end of the sheet base is located inside the connector through-hole and abuts a stepped face inside the connector through-hole, and the sheet base extends out of the connector through-hole beyond the connector rear end face.

5. The connectored optical fiber sheet of claim 1, wherein:
   the connector has a connector through-hole; and
   the optical fiber sheet has a positioning feature which abuts on an inner wall of the connector through-hole.

* * * * *